United States Patent Office 3,577,364
Patented May 4, 1971

---

3,577,364
COMPOSITIONS OF MATTER
Daniel S. Raden, Chicago, Ill., asignor to Velsicol
Chemical Corporation, Chicago, Ill.
No Drawing. Original application Oct. 22, 1965, Ser. No.
502,552, now Patent No. 3,509,199, dated Apr. 28,
1970. Divided and this application June 17, 1968, Ser.
No. 761,358
Int. Cl. C08g 22/24, 22/26, 22/44
U.S. Cl. 260—2.5                                6 Claims

ABSTRACT OF THE DISCLOSURE

The subject matter of this application is a new flame retardant rigid cellular plastic foam prepared from (5-methylene - 1,2,3,4,7,7 - hexachlorobicyclo[2.2.1] - 2-heptenyl)-2,4-diisocyanatophenyl ether, or compounds generically defined as

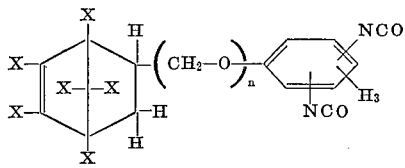

wherein X is halogen and n is 0 or 1.

---

This application is a division of my copending application Ser. No. 502,552, filed Oct. 22, 1965, now U.S. Pat. No. 3,509,199.

This invention relates to new compositions of matter. More specifically, this invention relates to new halogenated polyisocyanates which are useful in the production of rigid cellular polyurethane plastic foams having excellent flame retardance. The compounds of the present invention have the structure

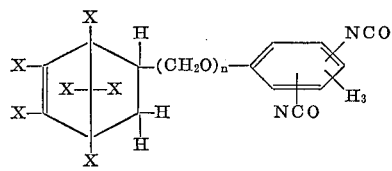

wherein X is halogen, preferably chlorine or bromine, and n is an integer from 0 to 1.

Cellular foam compositions have been found to be generally useful as insulation and as support for lightweight metal or plastic structures.

The procedure ordinarily followed in the use of such foams is to introduce the unfoamed composition into a cavity, such as between thin metal walls, and by the application of a foaming agent and/or moderate heat, promote the foaming action of said composition, thus filling the cavity and producing a rigid cellular plastic foam closely bonded to the walls of the cavity.

While conventional foams have been used as above described, they are not entirely satisfactory from several viewpoints. In particular, they are not satisfactory with respect to flame retardance and fire resistance and such properties are desirable and necessary in the production of equipment used in military aircraft, naval aircraft or on civilian aircraft where fire is a constant hazard.

Therefore, it is one object of the present invention to provide new polyisocyanates.

It is another object of the present invention to provide rigid cellular plastic foams which have the desirable properties of conventional foams and in addition have unusually high retardance to flame and resistance to burning.

Another object of the present invention is to provide a lightweight self extinguishing and often nonburning rigid cellular plastic foam useful in applications where conventional foams are presently used.

Still another object of this invention is to provide novel rigid cellular plastic foams having desirable properties, which inherently and permanently contain excellent flame retardance and fire resistance which cannot be destroyed by washing or leaching.

These and other objects and advantages of the present invention will be apparent from the following description and examples:

The compounds of the present invention can be prepared readily by reacting the corresponding (5-methylene-1,2,3,4,7,7-hexahalo bicyclo[2.2.1]-2-heptenyl)-diaminophenyl ether or 1,2,3,4,7,7-hexahalo-5-(diaminophenyl)-bicyclo[2.2.1]-2-heptene (hereinafter termed the "diamine"), with phosgene. These diamines can be prepared as described in U.S. Pats. 2,901,509 and 2,901,510. One method for performing the phosgenation is by dissolving phosgene in a suitable solvent such as ethyl acetate and dissolving the diamine, preferably in the same solvent. The two solutions can then be combined, preferably by their simultaneous addition to a vigorously stirred solvent such as ethyl acetate. It is preferable to add one-half of the amount of phosgene, preferably a large excess, to the diamine at a low temperature such as between about 18° C. and about 32° C. Thereafter the reaction mixture can be heated, to reflux if ethyl acetate is used as the solvent, and the remainder of the phosgene slowly added. Refluxing of the reaction mixture can be continued for several hours after completion of the addition to insure complete reaction. The desired isocyanate can be recovered from the reaction mixture by separating from the solvent, for example by removing the solvent by distillation in vacuo. The product can be purified, if desired, by trituration with, for example, diethyl ether. Exemplary of the polyisocyanate of the present invention are:

(5-methylene-1,2,3,4,7,7-hexachlorobicyclo[2.2.1]-2-heptenyl)-2,4-diisocyanatophenyl ether,
1,2,3,4,7,7-hexachloro-5-(2,4-diisocyanatophenyl)-bicyclo[2.2.1]-2-heptene,
(5-methylene-1,2,3,4,7,7-hexabromobicyclo[2.2.1]-2-heptenyl)-2,4-diisocyanatophenyl ether,
1,2,3,4,7,7-hexafluoro-5-(2,4-diisocyanatophenyl)-bicyclo[2.2.1]-2-heptene,
(5-methylene-1,2,3,4,7,7-hexachlorobicyclo[2.2.1]-2-heptenyl)-3,5-diisocyanatophenyl ether,
1,2,3,4,7,7-hexachloro-5-(3,5-diisocyanatophenyl)-bicyclo[2.2.1]-2-heptene,
(5-methylene-1,2,3,4,7,7-hexachlorobicyclo[2.2.1]-2-heptenyl)-2',6'-diisocyanatophenyl ether,
(5-methylene-1,2,3,4,7,7-hexachlorobicyclo-[2.2.1]-2-heptenyl)-3',4'-diisocyanatophenyl ether,
1,2,3,4,7,7-hexachloro-5-(2,5-diisocyanatophenyl)-bicyclo[2.2.1]-2-heptene,
1,2,3,4,7,7-hexachloro-5-(3,5-diisocyanatophenyl)-bicyclo[2.2.1]-2-heptene,
1,2,3,4,7,7-hexachloro-5-(3,4-diisocyanatophenyl)-bicyclo[2.2.1]-2-heptene and
1,2,3,4,7,7-hexachloro-5-(2,6-diisocyanatophenyl)-bicyclo[2.2.1]-2-heptene.

The foam of the present invention comprises a polyisocyanate of the present invention, a resin selected from the group consisting of polyethers and saturated polyesters, hereinafter denoted as the resin, and a foaming agent. Foams containing the polyisocyanates of the present invention are flame retardant and fire resistant by virtue of the inherent flame retardant properties provided by the polyisocyanate compounds of the present invention. These foams are self-extinguishing or non-burning depending on the concentrations of the new polyisocyanates in the foam. These foams require no additives of any kind to provide flame retardance nor do they require polymerization with flame retardant or fire resistant cross-linking agents. Moreover, the flame retardance and fire resistance of the present foams are permanent and cannot be washed or leached out of the foam as often occurred with previous fire resistant foams.

Thus, for the foam compositions of the present invention to possess the desired excellent flame retardant properties, it is preferred that the foam composition contain at least about 12% chlorine or about 5% bromine based on the weight of solids in the foam, contributed to the foam by the halogen in the polyisocyanates of the present invention. The term "solids in the foam" denotes the cellular material exclusive of volatile material entrapped therein, such as entrapped foaming agent.

The resins useful with the polyisocyanates of the present invention to produce the foams of this invention are the polyethers and saturated polyesters commonly used in the preparation of polyurethane foams. Preferably the resin is selected from the group consisting of a polyether comprising the reaction product of a monomeric 1,2-monoepoxide and a compound selected from the group consisting of polyhydric alcohols and polyhydric amines and a saturated polyester comprising the reaction product of a polyhydric alcohol and a polycarboxylic acid. In addition, certain flame retardant polyesters such as those containing halogen, for example the polyesters of chlorendic acid, or anhydride, or tetrachlorophthalic acid or anhydride can be used in preparing the foams.

Polyethers of the above description which are commonly used in polyurethane foams are the polyoxyalkylene ethers of polyfunctional alcohols or amines, such as the polyoxyethylene and polyoxypropylene ethers of glycerol, trimethylolpropane, hexanetriol, sorbitol, pentaerythritol, mannitol, dulcitol, sucrose and ethylenediamine. Exemplary of the polyesters described above are those derived from polyols and polyfunctional acids such as combinations of adipic, phthalic, succinic, sebacic, glutaric or azelaic acid or anhydride, ethylene glycol, propylene glycol, glycerol, trimethylolpropane, hexanetriol, sorbitol, pentaerythritol, mannitol, dulcitol and the like. The resin preferably has a high hydroxyl number in the order of from about 150 to about 700.

It is often desirable to utilize other polyisocyanates with the polyisocyanates of the present invention in the foams. This is particularly important where only limited amounts of halogen are required in the foam. While aliphatic polyisocyanates can be used to prepare the foams of the present invention, it is preferred to use aromatic polyisocyanates and particularly aromatic di- and triisocyanates. Suitable aromatic polyisocyanates are diphenylmethane diisocyanate, toluene diisocyanate, 1-chlorophenyl-2,4-diisocyanate, 1-5-naphthyl diisocyanate, 1,6-hexamethylene diisocyanate, triphenylmethane triisocyanate, polymethylene-polyphenyl-isocyanate, diphenyl-4,6,4' - triisocyanate, and the like.

The foam composition of the present invention preferably is comprised of at least about 30 parts of a polyisocyanate of the present invention and from 0 to about 40 parts by weight of an organic polyisocyanate such as those heretofore described so that the total polyisocyanate content is from about 45% to about 70% of the foam based on the weight of solids in the foam, from about 20 to about 40 parts by weight of a resin heretofore described, and from about 10 to about 25 parts by weight of a halogenated foaming agent.

The foam compositions of the present invention can be readily prepared using methods generally known to the urethane foam art. One such method is known as the "one-shot" method, while another is called the "prepolymer" method.

As an improvement in the preparation of the foams of the present invention it has been found advantageous to add a surfactant to the formulation before foaming. The preferred surfactants are the silicone surfactants, such as finely dispersed silicone oils, especially the dimethyl siloxane type, many of which are commercially available.

As an improvement in the mehtod of preparation of the foams of the present invention, the reaction of the polyisocyanate and the polyester and/or polyether preferably is performed in the presence of a catalyst. Suitable catalysts are tertiary amine catalysts and tin catalysts, many of which are widely known and are commercially available. Exemplary of these suitable catalysts are N,N,N',N'-tetramethyl butane-1,3-diamine, triethylenediamine, stannous octoate, stannous oleate, dibutyltin dioctoate, dibutyltin dilaurate, and the like. The tin catalysts are more powerful catalysts than the tertiary amine catalysts for the isocyanate-hydroxyl reaction and do not evaporate from the foam, as often occurs with the amine catalysts.

The most preferred catalyst for use in the improved process of preparing the foams of the present invention is a mixture of a tertiary amine catalyst and a tin catalyst. It is convenient and effective to utilize a lesser amount of the mixture to catalyze a given foam formulation than when only one type of catalyst is used.

Generally, only catalytic amounts of the catalyst are required, i.e., from less than one percent to about five percent by weight of the reaction mixture. From about 0.2 percent to about 1 percent of catalyst per weight of total reactants has been found generally adequate to catalyze the reaction described herein.

Like conventional foams, the compositions of the present invention may contain and utilize many of the presently used foaming agents. The preferred foaming agents are inert liquids which boil at the temperatures attained by the exothermic catalytic reaction of isocyanate and hydroxyl. Exemplary of the suitable inert organic liquid foaming agents are the halogenated lower alkanes, particularly, trichloromonofluoromethane.

After pouring from the mixing vessel into a suitable mold, hollow structural part, or the like, and the foam rises and hardens, the curing of the foam is completed by heating at a temperature of from about 100° F. to about 325° F. for from about one-half to about 24 hours to obtain the hard, substantially completely cross-linked foam.

The following examples illustrate the preparation of the new polyisocyanates and the formulation, preparation and curing of the foams of the present invention.

EXAMPLE 1

Preparation of (5 - methylene-1,2,3,4,7,7-hexachlorobicyclo[2.2.1]-2-heptenyl)-2,4-diisocyanatophenyl ether Phosgene (15.9 g.; 0.322 mol) was dissolved in ethyl acetate (100 ml.) and placed in a 125 ml. pressure-regulated addition funnel. This funnel was placed into one neck of a three-necked Morton flask containing ethyl acetate (100 ml.) cooled to about 18° C. The flask was equipped with a mechanical stirrer, a second 125 ml. pressure-regulated addition funnel and a water-cooled spiral condenser topped by a drying tube and vented to an aspirator. A tube led from the pressure-regulated addition funnel to below the surface of the ethyl acetate in the flask. The second addition tube was charged with (5-methylene-1,2,3,4,7,7 - hexachlorobicyclo[2.2.1]-2-heptenyl)-2,4-diaminophenyl ether (10 g.; 0.023 mol) dissolved in ethyl acetate (50 ml.). The ethyl acetate in the flask was vigorously stirred and one-half of the phosgene solution and all of the diamine solution were added simultaneously, dropwise to the flask. The temperature of the reaction mixture was maintained slightly below 32° C. by means of an ice-cooled bath. After the addition was completed, the reaction mixture was heated to reflux and the remainder of the phosgene solution was added dropwise at a rate sufficient to maintain the refluxing of the reaction mixture. Thereafter the reaction mixture was heated at reflux for three hours. The reaction mixtures was allowed to cool and the system was flushed with nitrogen by bubbling the gas through the reaction mixture. The ethyl acetate was removed from the reaction mixture by distilling under reduced pressure. The solid residue was triturated with diethyl ether to yield (5-methylene-1,2,3,4,7,7-hexachlorobicyclo[2.2.1]-2-heptenyl)-2,4-diisocyanatophenyl ether as a light tan solid melting 115–117° C. and having the following elemental analysis as calculated for $C_{16}H_6Cl_6N_2O_2$:

Theoretical (percent): C, 39.30; H, 1.65; Cl, 43.51; N, 5.73. Found (percent): C, 40.17; H, 2.81; Cl, 41.46; N, 5.53.

EXAMPLE 2

Preparation of 1,2,3,4,7,7-hexachloro-5-(2,4-diisocyanatophenyl)-bicyclo[2.2.1]-2-heptene Phosgene (51.3 g.; 0.518 mol) is dissolved in ethyl acetate (200 ml.) and placed in a 250 ml. pressure-regulated addition funnel positioned in one neck of a three-necked Morton flask containing ethyl acetate (100 ml.). A tube leads from the addition funnel to below the surface of the ethyl acetate in the flask. The flask is also fitted with a mechanical stirrer, a 125 ml. pressure-regulated addition funnel and a water-cooled spiral condenser topped by a drying tube and vented to an aspiratior. The 125 ml. addition funnel is charged with 1,2,3,4,7,7-hexachloro-5-(2,4-diaminophenyl)-bicyclo[2.2.1]-2-heptene (15 g.; 0.037 mol) dissolved in ethyl acetate (100 ml.). One-half of the phosgene solution and all of the diamine solution are added simultaneously, dropwise to the vigorously stirred ethyl acetate in the flask. The temperature of the reaction mixtnure during this addition is maintained at slightly below 32° C. After the addition has been completed, the reaction mixture is heated to reflux and the remainder of the phosgene solution is added dropwise to the reaction mixture at a rate sufficient to maintain the refluxing of the reaction mixture. Refluxing of the reaction mixture is continued for about 6 hours after the phosgene solution addition is completed. The reaction mixture is allowed to cool and the sysem is flushed with nitrogen gas by bubbling the gas through the reaction mixture. Ethyl acetate is removed from the reaction mixture by distilling under reduced pressure to give 1,2,3,4,7,7-hexachloro-5-(2,4-diisocyanatophenyl)-bicyclo[2.2.1]-2-heptene as the residue. This product can be purified by triturating with diethyl ether.

In the manner heretofore described, ether compounds within the scope of the present invention can be readily prepared. Presented in the following examples are the essential ingredients required to prepare the indicated named compounds according to the procedure detailed in the foregoing examples:

EXAMPLE 3

Phosgene+(5 - methylene - 1,2,3,4,7,7-hexachlorobicyclo[2.2.1]-2-heptenyl)-3,5-diaminophenyl ether=(5-methlyene - 1,2,3,4,7,7 - hexachlorobicyclo[2.2.1]-2-heptenyl)-3,5-diisocyanatophenyl ether.

EXAMPLE 4

Phosgene+(5 - methylene - 1,2,3,4,7,7-hexabromobicyclo[2.2.1]-2-heptenyl)-2,4-diaminophenyl ether=(5-methylene - 1,2,3,4,7,7-hexabromobicyclo[2.2.1]-2-heptenyl)-2,4-diisocyanatophenyl ether.

EXAMPLE 5

Phosgene+1,2,3,4,7,7 - hexabromo-5(2,4-diaminophenyl) bicyclo[2.2.1] - 2-heptene=1,2,3,4,7,7-hexabromo-5-(2,4-diisocyanatophenyl) bicyclo[2.2.1]-2-heptene.

EXAMPLE 6

Phosgene+(5 - methylene - 1,2,3,4,7,7 - hexafluorobicyclo[2.2.1]-2-heptenyl)-2,4-diaminophenyl ether=(5-methylene - 1,2,3,4,7,7 - hexafluorobicyclo[2.2.1]-2-heptenyl)-2,4-diisocyanatophenyl ether.

EXAMPLE 7

Phosgene+1,2,3,4,7,7 - hexachloro - 5(3,5-diaminophenyl) - bicyclo[2.2.1] - 2 - heptene=1,2,3,4,7,7 - hexachloro - 5 - (3,5 - diisocyanatophenyl)-bicyclo[2.2.1]-2-heptene.

EXAMPLE 8

Phosgene+1,2,3,4,7,7 - hexachloro - 5 - (2,5-diaminophenyl) - bicyclo[2.2.1] - 2 - heptene=1,2,3,4,7,7 - hexachloro - 5 - (2,5 - diisocyanatophenyl)-bicyclo[2.2.1]-2-heptene.

The following examples are illustrative of the preparation of foams of the present invention.

EXAMPLE 9

Preparation of a foam by the one-step method

A polyether based on trimethylolpropane and propylene oxide (31.5 g.), commercially obtained from Wyandotte Chemicals, United States of America, as "Pluracol TP–340" and having a hydroxyl number of about 550 is placed in a mixing vessel, followed by a silicone surfactant (0.6 g.) "DC–199" marketed by Dow-Corning Company, United States of America; dibutyltin dilaurate (0.6 g.); N,N,N′,N′-tetramethyl butane - 1,3 - diamine (0.6 g.) (hereinafter referred to as TMBDA), and trichloromonofluoromethane (14 g.). This mixture is mixed. The compound of Example 1 (37.9 g.) and toluene diisocyanate (14.8 g.) are mixed together and then added to the vessel. The resulting mixture is rapidly stirred mechanically for about 10 seconds and then poured into a one quart cylindrical paper container. After about 15 seconds the mixture rises into a foam and continues to rise for about one-half minute. The foam is then placed in an oven at about 70° C. for about 4 hours to complete the curing of the foam. This foam has a fine cell structure and is self-extinguishable.

EXAMPLE 10

Preparation of a foam

The following ingredients are placed in a mixing vessel and thoroughly stirred: A polyether tetrol, based on pentaerythritol and propylene oxide (28.5 g.), commercially obtained from Wyandotte Chemicals, United States of America, as "Pep 450" and having a hydroxyl number of about 550; silicone surfactant "DC–199" (0.7 g.) (heretofore described); dibutyltin dilaurate (0.6 g.); TMBDA (0.6 g.); and trichloromonofluoromethane (14.1 g.). The compound of Example 1 (34.6 g.) is mixed with polymethylene-polypropylene isocyanate (20.9 g.), marketed by Carwin Chemical Corporation Division of Upjohn Company, United States of America; and then added to the vessel. The resulting mixture was rapidly mechanically stirred for about 10 seconds and then poured into a one quart cylindrical paper container. The mixture rises into a foam and the latter is cured as described in the previous example. This foam is self-extinguishable, as can be determined by ASTM method D 1692–59T.

EXAMPLE 11

Preparation of a foam

The following ingredients are placed in a mixing vessel and stirred as described in the previous examples:

| | G. |
|---|---|
| Phthalic-adipic polyester hydroxyl No. 488 | 34 |
| "DC–199" | 0.6 |
| Dibutyltin dilaurate | 0.6 |
| TMBDA | 0.6 |
| Trichloromonofluoromethane | 13.9 |

Compound of Example 1 (36.1 g.) and toluene diisocyanate (14.2 g.) are mixed and then added to the vessel. The resulting mixture is mixed and poured as described in the previous examples. The foam thus obtained is self-extinguishable.

EXAMPLE 12

Preparation of a foam by the "pre-polymer" method

The compound of claim 1 (63.3 parts) and a polyol (10.6 parts), based on the product of propylene oxide and sorbitol, having a hydroxyl number of about 630, and marketed by Atlas Chemical Industries, Inc., United States of America, as "Atlas C–2406," are mixed using moderated heating if necessary. This pre-polymer is treated with a mixture of additional polyol (10.6 parts), silicone surfactant "DC–199" (0.6 part), dibutyltin dilaurate (0.5 part), TMBDA (0.5 part) and trichloromonofluoromethane (13.9 parts). The resultant mixture is thoroughly mixed and poured into a container as described in the previous examples. After the foam has risen, it is cured to obtain a non-burning foam.

I claim:

1. A flame retardant, rigid cellular plastic foam comprising
   (a) a compound of the structure

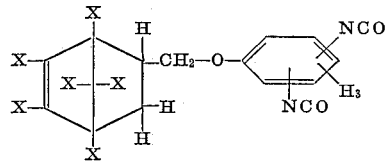

wherein X is halogen;
   (b) a resin selected from the group consisting of polyethers comprising the reaction product of a monomeric 1,2-monoepoxide and a compound selected from the group consisting of polyhydric alcohols and polyhydric amines, and saturated polyesters comprising the reaction product of a polyhydric alcohol and a polycarboxylic acid;
   (c) and a foaming agent.

2. A flame retardant, rigid cellular plastic foam of claim 1, wherein the resin has a hydroxyl number of from about 150 to 700 and the foaming agent is a halogenated hydrocarbon.

3. The foam composition of claim 1 wherein the diisocyanate is (5 - methylene - 1,2,3,4,7,7 - hexachlorobicyclo[2.2.1] - 2 - heptenyl) - 2,4 - diisocyanatophenyl ether.

4. The foam composition of claim 1 wherein the diisocyanate is (5 - methylene - 1,2,3,4,7,7 - hexachlorobicyclo[2.2.1] - 2 - heptenyl) - 3,5 - diisocyanatophenyl ether.

5. The foam composition of claim 1 wherein the diisocyanate is (5 - methylene - 1,2,3,4,7,7 - hexabromobicyclo[2.2.1] - 2 - heptenyl) - 2,4 - diisocyanatophenyl ether.

6. A flame retardant, rigid cellular plastic foam comprising
   (a) at least about 30 parts of a compound of the structure

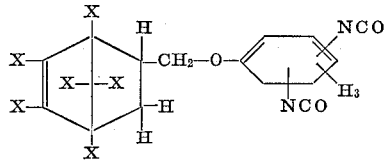

wherein X is halogen, and from about 0 to about 40 parts of an organic polyisocyanate, other than said compound, so that the total isocyanate content is from about 45% to about 70% of the foam based on the weight of solids in the foam;
   (b) from about 20 to about 40 parts of a resin having a hydroxyl number of from about 150 to about 700 selected from the group consisting of a polyether comprising the reaction product of a monomeric 1,2-monoepoxide and a compound selected from the group consisting of polyhydric alcohols and polyhydric amines, and a saturated polyester comprising the reaction product of a polyhydric alcohol and a polycarboxylic acid; and
   (c) from about 10 to about 25 parts of a halogenated hydrocarbon foaming agent.

References Cited

UNITED STATES PATENTS

| | | | |
|---|---|---|---|
| 2,901,509 | 8/1959 | Molotsky et al. | 260—571 |
| 2,901,510 | 8/1959 | Molotsky et al. | 260—578 |
| 3,141,900 | 7/1964 | Lynn et al. | 260—453 |
| 3,151,143 | 9/1964 | Hoch | 260—453 |
| 3,158,638 | 11/1964 | Hoch | 260—455 |
| 3,194,773 | 7/1965 | Hostettler | 260—2.5 |
| 3,222,387 | 12/1965 | Von Brachel et al. | 260—453 |
| 3,275,679 | 9/1965 | Brotherton et al. | 260—475 |

DONALD E. CZAJA, Primary Examiner

C. W. IVY, Assistant Examiner